United States Patent [19]

Dighe et al.

[11] Patent Number: 4,853,033
[45] Date of Patent: Aug. 1, 1989

[54] METHOD OF DESULFURIZING MOLTEN METAL IN A PLASMA FIRED CUPOLA

[75] Inventors: Shyam V. Dighe, North Huntingdon; Raymond F. Taylor, Irwin, both of Pa.

[73] Assignee: Electric Power Research Institute, Palo Alto, Calif.

[21] Appl. No.: 212,851

[22] Filed: Jun. 29, 1988

[51] Int. Cl.⁴ ............................................. C22B 4/00
[52] U.S. Cl. .................................... 75/10.22; 266/197
[58] Field of Search ......................... 75/10.22; 266/197

[56] References Cited

U.S. PATENT DOCUMENTS

| | | | |
|---|---|---|---|
| 4,530,101 | 7/1985 | Fey | 373/18 |
| 4,611,332 | 9/1986 | Santen | 75/10.22 |
| 4,687,512 | 8/1987 | Schrodter | 75/58 |
| 4,707,183 | 11/1987 | Michard | 75/10.22 |
| 4,769,065 | 9/1988 | Dighe | 75/10.22 |

OTHER PUBLICATIONS

"Plasma-Fired Cupola: An Innovation in Iron Foundry Melting", Dighe et al.
Dighe & Karp, "Test Results on a Pilot-Scale, Plasma-Fired Cupola for Iron Melting", ISPC-7 Eindhoven, pp. 1166-1173, (Jul. 1985).

Primary Examiner—Peter D. Rosenberg
Attorney, Agent, or Firm—Fred J. Baehr, Jr.

[57] ABSTRACT

A method of desulfurizing iron in a plasma fired cupola having a plurality if feed nozzles each of which have a particulate feed and a plasma torch connected thereto; a fluxing agent such as CaO, MgO, $CaCO_3$, $MgCO_3$ or $CaCO_3MgCO_3$ is fed to the feed nozzle and melted by the plasma torch; the molten fluxing agent mixes directly with the molten iron in the cupola and reacts with the sulfur in the iron; the reacted and unreacted fluxing agent combine with the slag reducing the viscosity making the slag flow better and producing a low sulfur iron in the cupola.

9 Claims, 1 Drawing Sheet

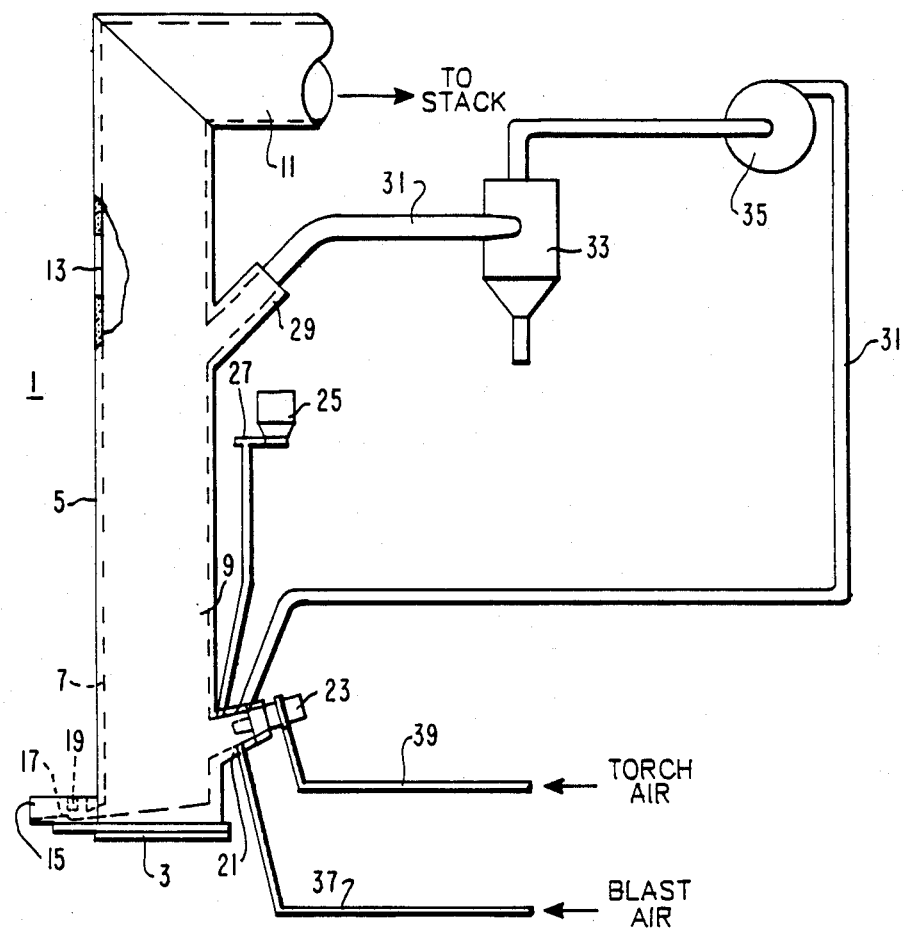

METHOD OF DESULFURIZING MOLTEN METAL IN A PLASMA FIRED CUPOLA

BACKGROUND OF THE INVENTION

The invention relates to a method of desulfurizing a molten metal in a cupola and more particularly to a method of desulfurizing iron in a plasma fired cupola.

The properties of iron depend on the levels of critical constituents that are present in the iron in the solution phase. One important constituent that greatly effects the properties is sulfur, S. In most grey iron products the percentage of sulfur in the composition of the iron is kept below 0.1%. In modular or ductile iron the percentage of sulfur is in the range of 0.008%.

When scrap iron is remelted, sulfur, mainly from the coke enters the melt and has to be removed prior to casting the iron. Removal of sulfur from iron has been accomplished in the cupola by what is called the basic slag mode, which requires that a high portion of the charge includes a slag forming material such as dolomite or limestone. The dolomite or limestone makes up about 5% to 15% of the charge. So that during calcining and fluxing portion of the melt the sulfur is captured by the slag and removed therewith. Thus a large portion of the energy produced by the coke is used to calcine the fluxing agent. The high quantity of fluxing agent also has a deleterious effect on the refractory lining, and also traps alloying elements such as silicon and manganese requiring that these be made up by adding ferro-silicon and ferro-manganese to the charge, which is expensive.

Desulfurization of iron can also be accomplished outside the cupola by adding calcium carbide to the molten iron in a ladle and bubbling nitrogen through the molten mass to effectuate mixing. The calcium sulfide formed combines with the unreacted calcium carbide to produce a doss which is skimmed from the top of the molten iron. The doss reacts with water to form acetylene which, when mixed with air, is explosive.

The object of this invention is to provide a method of desulfurizing iron in the cupola which is energy efficient, does not trap required alloying elements, does not produce an explosive by-product and is not deleterious to the refractory lining of the cupola.

SUMMARY OF THE INVENTION

In general, a method of desulfurizing molten metal in a plasma fired cupola, when performed in accordance with this invention, comprises the steps of: charging the cupola with scrap metal of metal ore, coke and a fluxing agent, igniting the coke and adding air to burn the coke and melt the scrap or metal ore to form a molten pool of metal and slag in the cupola, feeding a desulfurizing agent from a group comprising CaO and MgO into the feed nozzle, and operating the plasma torch at a power level sufficient to melt the desulfurizing agent fed into the feed nozzle, whereby the melted desulfurizing agent reacts with the sulfur in the molten pool of iron reducing the sulfur in the iron and the unreacted desulfurizing agent becomes part of the slag making the slag less viscous so that it flows better.

BRIEF DESCRIPTION OF THE DRAWINGS

The invention as set forth in the claims will become more apparent by reading the following detailed description in conjunction with the accompanying drawings, in which:

The Sole FIG. 1 is a schematic view of a plasma fired cupola utilized to practice this invention.

DESCRIPTION OF THE PREFERRED EMBODIMENT

Referring now to the sole FIGURE in detail there is shown a cupola 1, which is a furnace having a base portion 3 and a vertical cylindrical housing 5 extending upwardly from the base 3. The base 3 and housing 5 are lined with fire brick or other refractory material 7 forming a generally unobstructed round open shaft 9 with an exhaust gas conduit 11 connecting the upper end of the shaft 9 to a stack (not shown). A charge door comprising an opening 13 which is disposed adjacent the upper end of the shaft 9 for loading a charge into the cupola 1. A charge normally comprises coke, scrap iron and a fluxing agent such as dolomite or limestone. While iron is the normal metal produced in the cupola the desulfurizing method described hereinafter could be utilized for producing other metals, ores, alloys or other material.

Disposed adjacent the base portion 3 is a spout 15 having a dam 17 and a skimmer 19, which cooperate to separate the molten iron and slag which are separately drawn from the spout 15.

A plasma torch feed nozzle 21 is disposed in the lower portion of the shaft 9 with one end opening into the shaft 9 and has a plasma torch 23 disposed in the end opposite the end opening into the shaft 9. While only one plasma torch feed nozzle 21 is shown it is understood that any number of plasma torch feed nozzles 21 may be incorporated in the cupola 1 depending on the size and designed through put. The plasma torch feed nozzle 21 is described in detail in an allowed patent application entitled "Plasma Fired Feed Nozzle" filed 5/8/87 and assigned Ser. No. 047,811 that is hereby incorporated herein by reference.

A particulate material bin 25 is disposed above the plasma torch feed nozzle 21, and has a screw auger 27 or other feed means cooperatively associated therewith to control the flow of particulate material to the plasma torch feed nozzle 21. The bin 25 contains a desulfurizing agent from the group of desulfurizing agents comprising CaO, MgO, $CaCO_3$, $MgCO_3$, and $CaCO_3$, $MgCO_3$, which is fed to the plasma torch feed nozzle 21 by the screw auger 27 at the rate of approximately 1 to 2 pounds per hour per ton of iron melted depending on the amount of sulfur to be removed.

A gas take off nozzle 29 is disposed in fluid communication with the shaft 9 and with the plasma torch feed nozzle 21 via a duct or conduit 31 for recirculating off gas to the cupola via the plasma torch feed nozzle 21. Disposed in the conduit 31 is a cyclone separator 33 utilized to remove particulate matter from the off gas and a blower 35 to provide the energy to recirculate the off gas. A blast air conduit 37 is shown in fluid communication with the plasma torch feed nozzle 21 for supplying combustion air to burn the coke and a torch air conduit 39 is shown and is utilized to supply air to the plasma torch 23.

The operation of the cupola 1 in such a manner as to desulfurize the iron ore, another metal, a combination thereof; or another material, while the iron, other metal or material is in the pool of molten metal and slag in the cupola 1 is generally the same as for iron. Thus, while it is understood by those skilled in the art that this process can be utilized for desulfurizing other metals alloys, or other materials the desulfurization of iron will be described and is as follows:

A charge comprising various types of scrap iron, coke and a fluxing agent is placed in the shaft of the cupola 1 via the opening 13. The fluxing agent typically limestone or dolomite only makes up a small portion of the charge generally about 3% by weight. The coke, which makes up about 5 to 15% by weight of the charge, is ignited utilizing the plasma torch and air is supplied to burn the coke, melting the scrap iron, which makes up about 80 to 90% by weight of the charge, and forming a pool of molten iron covered with slag in the bottom portion of the shaft 9. A desulfurizing agent from a group of desulfurizing agents comprising CaO, MgO, $CaCO_3$, $MgCO_3$, and $CaCO_3$, $MgCO_3$ is fed to the plasma torch feed nozzle 21 by the screw auger 27 at a controlled rate generally in the range of 1 to 2 pounds per minute per ton per hour of scrap being melted depending on the quantity of sulfur to be removed from the iron. The power level of the torch is set to heat the fluxing agent and gases passing through the plasma torch feed nozzle to a temperature in the range of 2500 to 3500 F., which causes the desulfurizing agent to melt. The melted sulfurizing agent enters the shaft 6 adjacent the top of the pool of molten iron and slag and combines therewith, the desulfurizing agent reacts with the sulfur in the molten iron removing it therefrom by combining with the slag. The unreacted desulfurizing agent also combines with the slag reducing the viscosity of the slag so that it flows better.

Because the sulfur level is substantially reduced, in one test run it was reduced to 0.003%, the molten iron can be poured directly from the cupola into a mold to form commercial products. The low sulfur content also allows the molten iron be poured directly from the cupola 1 into in-flask molds containing magnesium to produce nodular iron therein.

The method of desulfurizing molten iron in a cupola as described herein advantageously minimizes the energy required for the desulfurization, has a minimum effect on the life of the refractory lining in the cupola 1 and does not trap other alloying elements in the slag requiring the addition of expensive ferro alloying elements to provide the proper chemistry of the iron so that it can be used commercially directly as it comes from the cupola 1.

What is claimed is:

1. A method of desulfurizing a material in a plasma fired cupola having a plasma torch feed nozzle with a plasma torch and particulate feed system cooperatively associated therewith, the method comprising the steps of:

charging the cupola with the material, coke and a fluxing agent;
   igniting the coke and adding air to melt the material to form a pool of molten material and slag;
   feeding a desulfurizing agent from a group comprising CaO, MgO, $CaCO_3$, $MgCO_3$, and $CaCO_3$ $MgCO_3$ into the plasma torch feed nozzle;
   feeding air into the plasma torch feed nozzle; and
   operating the plasma torch at a power level sufficient to melt the desulfurizing agent in the plasma torch feed nozzle, so that the melted desulfurizing agent and air reaches a temperature of 2500° to 3500° F. prior to entering the cupola adjacent the molten pool whereby the melted desulfurizing agent mixes directly with the molten pool and reacts with the sulfur in the molten material to desulfurize the molten material in the pool, and the reacted and unreacted melted desulfurizing agent become part of the slag, making the slag less viscous and thus the slag flows better.

2. The method of claim 1, wherein the step of charging the cupola comprises charging the cupola with a material in the form of a metal ore.

3. The method of claim 1, wherein the step of charging the cupola comprise charging the cupola with a material in the form of scrap metal.

4. The method of claim 1, wherein the step of charging the cupola comprises charging the cupola with a material in the form of scrap iron.

5. The method of claim 1, wherein the step of operating the plasma torch comprises operating the plasma torch at a power level sufficient to raise the temperature of the effluent gases and effluent desulfurizing agent to a temperature in the range of 2500 to 3500 F.

6. The method of claim 1, wherein the step of charging the cupola further comprises charging the cupola so that the fluxing agent in the charge is about 3% by weight of the total charge.

7. The method of claim 4 and further comprising the steps of:
   providing an in-flask mold;
   placing magnesium in the in-flask mold; and
   pouring molten iron from the cupola into the mold to form nodular iron in the mold.

8. The method of claim 7, wherein the step of operating the plasma torch comprises operating the plasma torch at a power level sufficient to raise the temperature of the effluent gases and effluent additional fluxing agent to a temperature in the range of 2500 to 3500 F.

9. The method of claim 7, wherein the step of charging the cupola further comprises charging the cupola so that the fluxing agent in the charge is about 3% by weight of the total charge.

* * * * *